Patented June 17, 1930

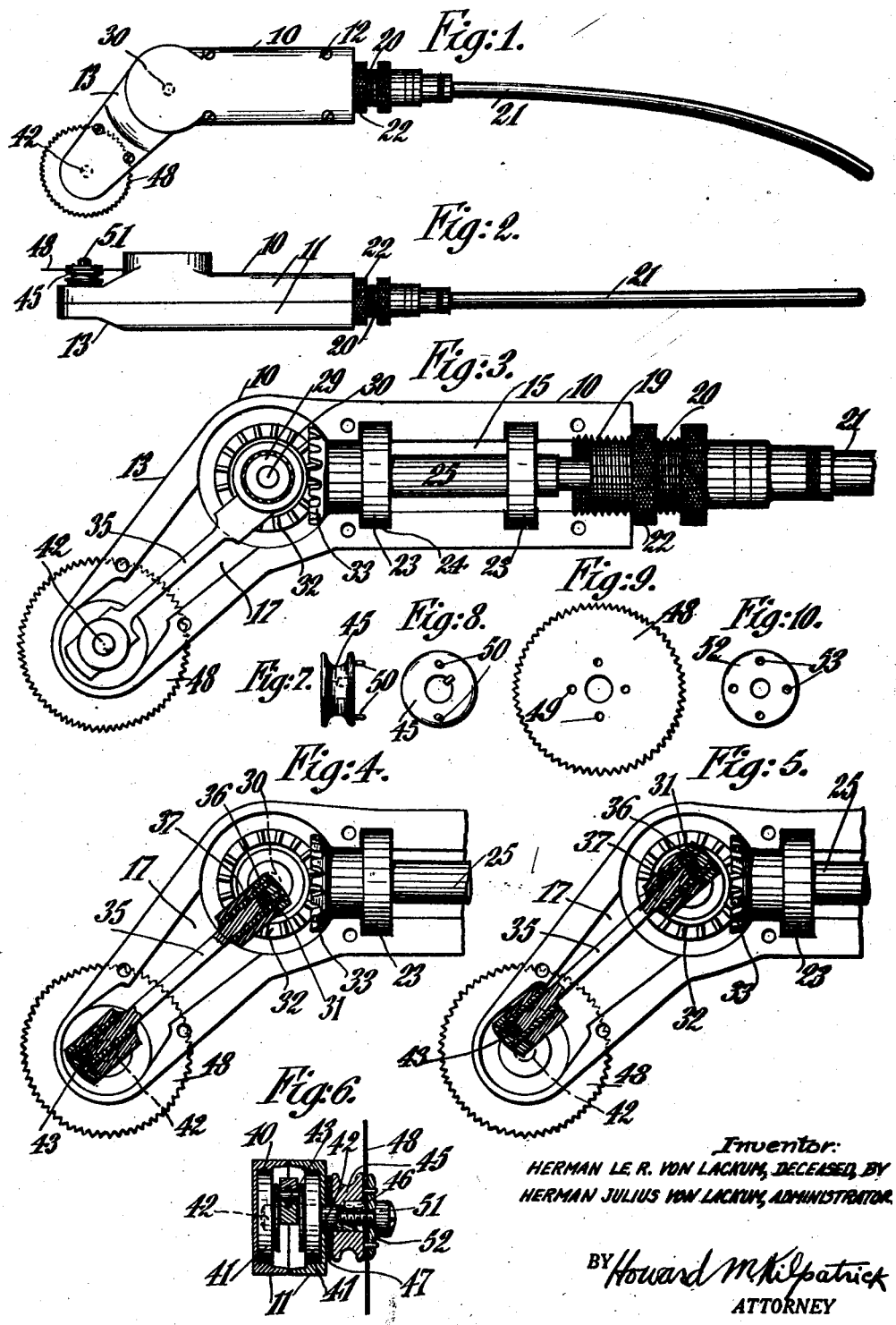

1,763,730

UNITED STATES PATENT OFFICE

HERMAN LE ROY von LACKUM, DECEASED, LATE OF NEW YORK, N. Y., BY HERMAN JULIUS VON LACKUM, ADMINISTRATOR, OF DYSART, IOWA

SURGICAL SAW

Application filed February 7, 1929. Serial No. 338,258.

This invention relates to surgical or bone saws and more particularly to surgical saws, of the type comprising a small circular saw mounted on a freely movable handle and driven by a flexible shaft.

One object of the invention is to provide a device of this kind which may be run slowly, which will not overheat and which will not require cooling by water.

Another object of the invention is to provide a saw of this kind which is easy to operate and operates with less danger than saws heretofore known.

Another object of the invention is to provide a saw of this kind which operates substantially free from danger of damage from catching in drapes and the like.

Other objects of the invention are to improve generally the simplicity and efficiency of such saws and to provide a saw of this kind which is clean, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved surgical saw which, briefly stated, includes a movable handle carrying a transverse rotary crank shaft and means whereby the crank shaft is driven by the drive element of the flexible shaft connected to a suitable motor.

A transverse oscillatory crank shaft mounted in the handle is provided with a driven crank connected by a link to a drive crank formed on said rotary shaft. The radius of the driven crank is longer than the radius of the drive crank whereby when the rotary shaft rotates the oscillatory shaft oscillates.

A collar secured on a projecting end of said oscillatory shaft is provided on one side face with projections disposed equal angles apart and adapted to receive perforations disposed equal angles apart on an oscillatory circular saw suitably held on the collar.

In the accompanying drawing showing, by way of example, one of many possible embodiments of the invention, Fig. 1 is a fragmental side elevation showing the assembled saw and part of its flexible drive shaft;

Fig. 2 is a fragmental plan showing the saw as in Fig. 1;

Fig. 3 is a side elevation of the saw, parts being removed, showing the interior of the saw handle and the mechanism therein;

Fig. 4 is a fragmental similar side elevation showing the parts in one position;

Fig. 5 is a similar fragmental side elevation showing the parts in another position;

Fig. 6 is a transverse sectional view, partly in elevation, the section being taken substantially in the plane of the oscillatory shaft and its crank;

Fig. 7 is an edge elevation showing the collar on which the circular saw is mounted;

Fig. 8 is a face elevation of the collar;

Fig. 9 is a face elevation showing the circular saw; and

Fig. 10 is a face elevation showing the washer which in part holds the circular saw in place.

The various parts of the improved circular saw are carried in and by a handle 10 formed of a pair of longitudinal handle members 11 suitably secured together by screws 12 and formed with an angularly disposed outer end portion 13 and hollowed out to form a chamber having a longitudinal portion 15 extending from the inner end to an angle or elbow part and an inclined portion 17 extending to near the outer end to the handle.

Said longitudinal portion 15 of the chamber is threaded as at 19 at the inner end of the handle for the reception of a threaded sleeve 20 of a flexible shaft 21 from a suitable source of power, the threaded sleeve being adjustably engaged in the threaded end 19 of the chamber and having a jamnut 22 thereon engageable with the end of the handle to lock the sleeve in position.

A pair of sets of ball bearings 23 seated in annular grooves 24 carry a longitudinal shaft 25 secured to and driven by the drive element of the flexible shaft 21.

In said members 11 at said elbow part 16 are provided opposed recesses similar to the recesses 40 of Fig. 6; and in these recesses are received sets of ball-bearings 29 receiving a transverse rotary crank shaft 30 formed intermediately with an eccentric portion or drive crank 31 (Figs. 4 and 5) of small radius. A miter driven gear 32 fast on the crank shaft 30 meshes with a drive gear 33 for rotating the crank shaft.

A link 35 in said inclined portion 17 has a transverse bearing bore received on said crank 31, the head of the link being transversely split through the bore to form a removable portion 36 removably secured in place by longitudinal screws 37 whereby the link may be assembled and disassembled from the crank 31.

The opposed recesses 40 (Fig. 6) provided in the outer end of said inclined portion carry bearings sets 41 receiving a transverse oscillatory crank shaft 42 provided intermediately with a driven crank or an eccentric portion 43. The outer end of the link 35 is provided with a head similar to that of the inner end and is provided with a bore received on said driven crank 43.

The radius of the driven crank 43 is enough longer than the radius of the drive crank 31 of the rotary shaft to cause the oscillatory shaft to oscillate through an angle of only about ninety degrees while the rotary shaft completely rotates continuously in one direction.

The oscillatory shaft 42 is projected through an opening in one side of the handle to form a saw carrying end carrying a disk collar 45 keyed on said end by means of a key 46 received in a seat in said end. A felt washer 47 interposed between said handle and collar cushions the collar and prevents the ingress or egress of liquids or oil.

A completely toothed oscillatory saw 48 having its teeth active in either direction is mounted against the outer face of the collar, and has four perforations 49 (Fig. 9), two of which are received on diametrically disposed projections 50 on the outer face of the collar. Said perforations are ninety degrees apart, substantially the distance of the oscillation and the saw may be removed and replaced to bring any quadrant of the saw into action as the other quadrants become worn or dulled.

An axial screw 51 (Fig. 6) received in an axial bore in the shaft 42 has its head engaged against a washer 52 engageable with the saw to hold the saw firmly on the collar. Said washer is provided with perforations 53 (Fig. 10) in which the ends of said projections are received.

The operation is simple, and is obvious from the foregoing. Power is applied through the flexible shaft, and rotates the main longitudinal drive shaft 25 and in turn the transverse rotary crank shaft 30. The crank 31 of the shaft 30 then imparts to the link 35 a compound reciprocatory motion which oscillates the shaft 42 and the saw.

The saw is applied in the usual manner. The saw because of the oscillatory motion may be more slowly operated than other circular saws, with more safety, less heating and without the necessity of cooling with water. It is easier to handle and less dangerous to the patient or surgeon, and does not cause the damage caused by the rotary saw if caught in the drapes during use.

When one quadrant of the saw becomes worn or dull, it is only necessary to remove the screw 51, the washer 52 and the saw, and to turn the saw to another position before replacing them.

Claims:

1. A surgical instrument comprising a handle; an oscillatory member mounted thereon; means for imparting oscillation to said member; and a circular saw angularly adjustably mounted on said member co-axial with the axis of the oscillation the saw being oscillatory and operative in its different positions of adjustment.

2. A surgical instrument comprising a handle; an oscillatory shaft carried on the handle; drive means for imparting oscillatory motion to said shaft; and an angularly adjustable circular saw mounted on said shaft the saw being oscillatory and operative in its different positions of adjustment.

3. A surgical instrument comprising a support; an oscillatory saw on said support having an arcuate cutting edge concentric with its axis of oscillation; and means for imparting oscillatory movement to the saw the saw being oscillatory and operative in its different positions of adjustment.

4. A surgical instrument comprising a handle; a flexible shaft connected to the handle: a transverse rotary crank shaft disposed across the handle and formed with a drive crank; means whereby the crank shaft is driven by the drive element of the flexible shaft; a transverse oscillatory crank shaft mounted in the handle and provided with a driven crank; a link pivoted to said cranks respectively; the radius of the driven crank being longer than the radius of the drive crank; and a saw mounted upon said oscillatory shaft and having an arcuate toothed edge.

5. A surgical instrument comprising a handle hollowed out to form a chamber extending from the inner end to near the outer end to the handle and threaded at the inner end; a flexible power shaft provided with a threaded sleeve engaged in the threaded end of the chamber; a longitudinal shaft rotatably mounted in said handle and driven by the drive element of the flexible shaft; a miter drive gear fast on the longitudinal shaft; a transverse rotary crank shaft disposed across the chamber and formed intermediately with a drive crank; a driven gear fast on the crank shaft meshing with said drive gear; a transverse oscillatory crank shaft near the outer end of said chamber and provided intermediately with a driven crank; a link provided at opposite ends with transverse bores received on said cranks respectively; the radius of the driven crank being longer than the radius of the drive crank to cause the oscillatory shaft to oscillate about ninety degrees; and a circular saw mounted on said oscillatory shaft.

6. A surgical saw comprising a handle having a chamber therein; a flexible shaft connected to the handle; a transverse rotary crank shaft disposed across the handle and formed with a drive crank; means in said chamber whereby the crank shaft is driven by the drive element of the flexible shaft; a link in said chamber having a transverse bearing bore received on said crank, the head of the link being transversely split through the bore to form a removable portion removably secured in place by longitudinal screws, whereby the link may be assembled or disassembled; a transverse oscillatory crank shaft mounted across said chamber and provided intermediately with a driven crank; the outer end of the link being provided with a head similar to the inner end and provided with a bore received on said driven crank; the radius of the driven crank being enough longer than the radius of the drive crank of the rotary shaft to cause the oscillatory shaft to oscillate while the rotary shaft rotates continuously in one direction; and a circular saw mounted on the oscillatory shaft.

7. A surgical saw comprising a handle having a chamber therein; an oscillatory shaft carried in the handle across said chamber; drive means in the chamber for imparting rotary motion to said shaft; the oscillatory shaft having a saw carrying end projected through one side of the handle; a collar secured on said end and provided with an outer flat face; a felt washer between said collar and handle; and a circular saw mounted against said flat face.

8. A surgical saw comprising a handle; an oscillatory shaft mounted thereon; means for imparting oscillation to said shaft; a collar secured on said oscillatory shaft and provided on one side face with projections disposed equal angles apart; an oscillatory circular saw having perforations disposed equal angles apart and receivable on said projections; and means to hold the saw on the collar.

9. A surgical saw comprising a handle; an oscillatory shaft mounted thereon; means for imparting oscillation to said member; the oscillatory shaft having a saw carrying end projected from one side of the handle provided with a threaded axial bore; a collar secured on said end and provided in its outer flat face with diametrically located projections; an oscillatory circular saw having a central opening registerable with said axial bore; and four perforations disposed ninety degrees apart receivable on said projections; and an axial screw received in said threaded bore and having its head engageable with the saw to hold the saw on the collar.

10. A surgical saw comprising a handle; a flexible shaft connected to the handle; a transverse rotary crank shaft disposed across the handle and formed with a drive crank; means whereby the crank shaft is driven by the drive element of the flexible shaft; a transverse oscillatory crank shaft mounted in the handle and provided with a driven crank; a link pivoted to said cranks respectively; the radius of the driven crank being longer than the radius of the drive crank; a collar secured on said oscillatory shaft and provided on one side face with projections disposed equal angles apart; an oscillatory circular saw having perforations disposed equal angles apart and receivable on said projections; and means to hold the saw on the collar.

11. A surgical saw comprising a handle having a chamber therein; an oscillatory shaft carried in the handle across said chamber; means in the chamber for imparting oscillatory motion to the shaft; the oscillatory shaft being projected through one side of the handle to form a saw carrying end provided with a key seat and a threaded axial bore, a disk collar keyed on said end by means of a key received in said seat and provided in its outer flat face with a pair of diametrically located projections; a felt washer interposed between said handle and collar; a completely toothed oscillatory saw having its teeth active in either direction and a central opening registerable with said axial bore, and four perforations disposed ninety degrees apart receivable on said projections to permit the bringing of any quadrant of the saw into action as the other quadrants become worn or dulled; and an axial screw received in said bore and having its head engageable with the saw to hold the perforations on the projections and the saw firmly on the collar.

12. A surgical saw comprising a handle formed of a pair of longitudinal handle members suitably secured together by screws and formed with an angularly disposed outer end portion and hollowed out to form a chamber having a longitudinal portion extending from the inner end to the angle or elbow part and an inclined portion extending to near the outer end to the handle; said longitudinal portion being provided intermediately with a pair of annular recesses and threaded at the inner end of the handle; a flexible shaft for connection with a suitable source of power provided with a threaded sleeve adjustably engaged in the threaded end of the chamber and having a jam nut thereon engageable with the end of the handle to lock the sleeve in position; a pair of sets of ball bearings comprising outer recess seated in said annular grooves; a longitudinal shaft received in said bearing and secured to and driven by the drive element of the flexible shaft; an oscillatory shaft mounted across the outer end of the inclined portion of said chamber; a circular saw on said oscillatory shaft; and means in said inclined portion and driven by the longitudinal shaft and imparting oscillatory motion to the oscillatory shaft.

13. A surgical instrument comprising a handle; a flexible shaft connected to the handle; an oscillatory member on the handle; means interposed between the shaft and member for oscillating the latter with a gradually reversing accelerating, deaccelerating and reversing movement; and a saw on said member having a toothed edge concentric to the axis of oscillation and projecting beyond said edge.

14. A surgical instrument comprising a handle; a flexible shaft connected to the handle; a rotary member mounted on the handle and driven by said shaft and provided with an eccentric drive part; an oscillatory member mounted on the handle and provided with an eccentric driven part; means interposed between said parts for driving the oscillating part with a gradually reversing movement; and a saw mounted upon said oscillatory member and having an arcuate toothed edge projecting beyond the handle.

15. A surgical instrument comprising a handle; a flexible shaft connected to the handle; a transverse rotary shaft disposed across the handle and formed with a drive crank; means whereby the drive shaft is driven with the drive element of the flexible shaft; a transverse oscillatory crank shaft mounted on the handle and provided with a driven crank; a link connecting said crank; and a saw mounted upon said oscillatory shaft and having an arcuate toothed edge projecting beyond the handle.

16. A surgical instrument comprising a handle having a chamber therein; a flexible shaft connected to the handle; an oscillatory shaft carried in the handle transverse to said chamber and having a projecting end projecting through one side of the handle; means interposed between said shafts for oscillating the oscillatory shaft; and a circular saw angularly adjustably mounted on said projecting end concentric therewith.

HERMAN JULIUS VON LACKUM,
*Administrator of the Estate of Herman Le Roy von Lackum, Deceased.*